United States Patent Office 2,886,590
Patented May 12, 1959

2,886,590

DIESTER LUBRICANT

Charles W. Montgomery and William I. Gilbert, Oakmont, and John G. McNulty, Glenshaw, Pa., assignors to Gulf Research & Development Company, Pittsburgh, Pa., a corporation of Delaware No Drawing. Application August 28, 1957
Serial No. 680,669

1 Claim. (Cl. 260—484)

This invention relates to a new compound. More particularly, it is concerned with an ether-ester having good lubricating properties.

As is known in the art, ester type synthetic lubricants have been developed to provide lubrication in those instances where ordinary mineral lubricating oil compositions are not entirely satisfactory. The development of ester type lubricants is difficult because of the stringent specifications to be met. Accordingly, the development of such lubricants is almost entirely empirical.

We have now found that a new compound, the diester of isoamyl alcohol and di(carboxymethoxy)ethyl ether, provides good lubricating properties. This compound is also known as the diester of isoamyl alcohol and 3,6,9-trioxa-1,11-undecanedioic acid and has the formula

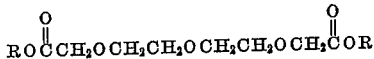

wherein R is the isoamyl radical.

The diester of isoamyl alcohol and di(carboxymethoxy) ethyl ether is a clear viscous liquid having a boiling point at 0.2 mm. of 161°–164° C. and a specific gravity at 60°/60° F. of 1.0276. It can readily be prepared in good yields by esterifying an excess of isoamyl alcohol with di(carboxymethoxy)ethyl ether in the presence of anhydrous HCl. The di(carboxymethoxy)ethyl ether is prepared in known manner by the mild oxidation of tetraethylene glycol with, for example, 50 percent nitric acid.

As a specific example of the preparation of the new diester, a mixture of 528.9 grams (6 mols) of isoamyl alcohol and 333.3 grams (1.5 mols) of di(carboxymethoxy)ethyl ether is heated in a flask equipped with a condenser and a trap from which part or all of the condensate can be withdrawn and the remainder returned to the flask. A slow stream of anhydrous HCl is bubbled through the liquid in the flask. At a temperature of 109° C. esterification begins and water is collected in the trap. The reaction is followed by the amount of water formed, and when 54 grams of water is obtained the reaction is considered complete, the temperature at this time having reached 143° C. When the reaction is complete, the residue in the flask is vacuum distilled at 10 mm. Hg to remove the unreacted alcohol and then at 0.2 mm. to remove the ester from any higher boiling residue. A yield of 87.1 percent of the ester is obtained based on the di(carboxymethoxy) ethyl ether charged.

The diester of isoamyl alcohol and di(carboxymethoxy) ethyl ether, as prepared above, had the following typical inspection:

| | |
|---|---|
| Gravity: ° API | 6.2 |
| Sp. gr., 60°/60° F. | 1.0276 |
| Viscosity, kinematic, cs.: | |
| 100° F. | 11.23 |
| 210° F. | 2.81 |
| −65° F. | 40,569 |
| Viscosity index | 105 |
| Pour point, ° F.: ASTM D92-47 | <−75 |
| Flash, O.C., ° F.: ASTM D92-46 | 415 |
| Fire, O.C., ° F.: ASTM D92-46 | 445 |
| Low temp. stability (72 hrs. at −65° F.) | Passes |
| Neut. No. | 0.37 |
| Sap. No. | 300 |

The high viscosity index, high flash and fire points, extremely low pour point and excellent low temperature stability indicate that the new diester is capable of varied applications as a lubricant. These data, and in addition the high specific gravity, also show the new diester to be suited for use as an hydraulic fluid and a plasticizer.

The lubricating properties of the ester of the invention were further tested by determining its coefficient of friction and subjecting it to the well-known Falex wear test. The results obtained are as follows:

| | |
|---|---|
| Coefficient of static friction steel-steel | 0.23 |
| Falex wear: No. of teeth | 21 |

We claim:
The diester of isoamyl alcohol and 3,6,9-trioxa-1,11-undecanedioic acid.

References Cited in the file of this patent

UNITED STATES PATENTS

| | | |
|---|---|---|
| 2,372,808 | Bruson | Apr. 3, 1945 |
| 2,554,667 | De Groote | May 29, 1951 |
| 2,659,754 | Ash et al. | Nov. 17, 1953 |